(12) United States Patent
Shigemi et al.

(10) Patent No.: US 6,279,006 B1
(45) Date of Patent: Aug. 21, 2001

(54) STRUCTURED DATA MANAGEMENT SYSTEM AND COMPUTER-READABLE RECORDING MEDIUM STORING STRUCTURED DATA MANAGEMENT PROGRAM

(75) Inventors: Nobuhisa Shigemi; Hiroyuki Yamamoto; Gengo Tazaki; Makoto Yoshioka; Mitsuhiro Kokubun, all of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/172,243

(22) Filed: Oct. 14, 1998

(30) Foreign Application Priority Data

Apr. 14, 1998 (JP) ................................. 10-102271

(51) Int. Cl.[7] ...................................... G06F 17/30
(52) U.S. Cl. ......................... 707/101; 707/102; 707/100; 707/103
(58) Field of Search .................... 707/100, 101, 707/102, 103, 104, 10, 4, 6, 513, 515; 709/316

(56) References Cited

U.S. PATENT DOCUMENTS

| 5,504,906 | * | 4/1996 | Lutoff | 709/316 |
|---|---|---|---|---|
| 5,675,780 | * | 10/1997 | Plant-Mason et al. | 707/6 |
| 5,737,592 | * | 4/1998 | Nguyen et al. | 707/4 |
| 5,761,684 | * | 6/1998 | Gibson | 707/515 |
| 5,946,697 | * | 8/1999 | Shen | 707/104 |
| 6,061,698 | * | 5/2000 | Chadha et al. | 707/513 |
| 6,098,067 | * | 8/2000 | Erickson | 707/10 |

* cited by examiner

*Primary Examiner*—Thomas Black
*Assistant Examiner*—Frantz Coby
(74) *Attorney, Agent, or Firm*—Staas & Halsey LLP

(57) ABSTRACT

A structured data management system capable of easily changing the definition of a logical structure and controlling semantics described in data adapted to the defined structure as intended by persons who have defined the logical structure. A contents model defines an internal structure of a contents description. The contents description describes data to be managed according to the contents model. An operation description is coupled to the contents model and manipulates data in the contents description depending on the structure of the data in the contents description. The operation description functions to define semantics of each element of the structure defined by the contents model. An operation description executing unit executes the operation description coupled to the contents model. A structure managing unit verifies and manages the structure of the contents description according to the contents model.

11 Claims, 21 Drawing Sheets

<HTML>
<HEAD>
<TITLE>order of ***</TITLE>
<SCRIPT>
function formORrefuse(){
  var today = new Date;
  var hour  = today.getHours();
  var message = "";
  if (hour < 9 || hour >= 17) {
    message += "<FONT COLOR='red'><B>service is being interrupted at present time
</B></FONT><BR>";
    message += "<FONT COLOR='blue'>try accessing once more</FONT>";
  } else {
    message += "<FORM ACTION='./order.cgi' METHOD='post'>";
    message += "post: <INPUT TYPE='text' NAME='belong'><BR>";
    message += "name: <INPUT TYPE='text' NAME='name'><BR>";
    message += "count: <INPUT TYPE='text' NAME='count'><BR>";
    message += "<INPUT TYPE='submit' VALUE='order' onClick='return top.order(this.form);'>";
    message += "<INPUT TYPE='reset' VALUE='cancel'></FORM>";
  }
  document.write(message);
} function isPlusInt(val){
  if (val==""){ return false; }
  for (var i=0 ; i<val.length ; i++){
    var oneChar = val.charAt(i);
    if (oneChar < "0" || oneChar > "9"){
      return false;
    }
  }
  return true;
}
```

```
function order(f){
  var newwin = window.open("","newwin","height=100,width=200");
  var belong = f.belong.value;
  var name   = f.name.value;
  var count  = f.count.value;
  var kekka  = true;
  var message = "<HTML><HEAD></HEAD><BODY>";
  if (belong == ""){
    message += "write post<BR>";
    kekka = false;
  }
  if (name == ""){
    message += "write your name<BR>";
    kekka = false;
  }
  if (!isPlusInt(count)){
    message += "write the number of *** to be ordered accurately<BR>";
    kekka = false;
  }
  if (kekka){
    message += "Mr. (Ms)" + name + "of" + belong, + count of + "***" + "will be ordered.";
  }
  message += "<FORM><INPUT TYPE=BUTTON VALUE='closed'
onClick='window.close()'></FORM></BODY></HTML>";
  newwin.document.write(message);
  return kekka;
}
</SCRIPT>
</HEAD>
<BODY>
<H1>order of ***</H1>
<SCRIPT>top.formORrefuse()</SCRIPT>
</BODY>
</HTML>
```

FIG. 8

[CONTENTS OF SCRIPT]
EXTRACT DATE OF GENERATION FROM 11d

```
[Example of DTD]
(!DOCTYPE document [
(!ELEMENT document -- (preamble, text))
(!ELEMENT preamble -- (title, date_of_generation,
                      person_who_generated_document))
(!ELEMENT title    -- (#PCDATA))
(!ELEMENT date_of_generation -- (#PCDATA))
(!ELEMENT person_who_generated_document -- (#PCDATA))
(!ELEMENT text    -- (#PCDATA))
])
```

12d

```
[Example of SGML instance]
<document>
 <preamble>
  <title>sample document</title>
  <date_of_generation>Feb.5, 1998 15:30
  </date_of_generation>
  <person_who_generated_document>## ##
  </person_who_generated_document>
 </preamble>
 <text>
 This document is a good example showing how different
 it is to acquire contents of SGML instance depending on
 whether there is an object manager or not.
 </text>
</document>
```

13n

```
[example of script when there is an object manager]

"document.preamble.date_of_generation" getChildTag getElementText
/dateOfGeneration exch def
```

550

```
/searchTag
{
  % THE TAG NAME
  /searchTagName exch def
  {
    oneLine searchTagName search
    {
      oneLine searchTag pop pop /oneLine exch def
      exit
    }
    {
      pop
      getNextLine /oneLine exch def
    } ifelse
  } loop
} def getNextLine /oneLine exch def
"<document>" searchTag
"<preamble>" searchTag
"<date_of_generation>" searchTag "" /dateOfGeneration exch def
{
  oneLine "</date_of_generation>" search
  {
    pop pop dateOfGeneration exch catenate /dateOfGeneration
    exch def exit
  }
  {
    pop
    dateOfGeneration oneLine catenate /dateOfGeneration exch
    def getNextLine /oneLine exch def
  } ifelse
} loop
```

113a

```
[example of script to determine date of generation and
write date in designated tag]

/writeDeteOfGeneration
{
  % THE PRESENT TAG POSITION
    getTodayDate setElementText
} def
```

FIG.11

```
[agenda DTD]
<!DOCTYPE agenda [
<!ELEMENT agenda -- (name, preamble, text)>
<!ELEMENT name -- (#PCDATA)>
<!ELEMENT preamble -- (agenda, date, place, attendants,
                       recorder, distributed materials,
                       next_schedule?)>
<!ELEMENT subject -- (#PCDATA)>
<!ELEMENT date -- (#PCDATA)>
<!ELEMENT place -- (#PCDATA)>
<!ELEMENT attendants -- (person*)>
<!ELEMENT person -- (names, post, e-mail)>
<!ELEMENT post -- (#PCDATA)>
<!ELEMENT e-mail -- (#PCDATA)>
 . . .
]>
```

111c

```
[agenda SGML instance]
<agenda>
 <name>18th project meeting agenda</name>
 <preamble>
  <subject></subject>
  <date>Jan. 19, 1998 9:30 - 10:30</date>
  <place>1st meeting room</place>
  <attendants></attendants>
 . . .
</agenda>
```

```
[agenda operation description]
agenda start defining operator of object

%────────────────────────────────────────

/onStartOperator
% [input] (none) [output] (none)
% [funciton] check meeting room reservation database,
%             and write place and date for meeting.
%────────────────────────────────────────
{
  meetingRoomReservationDB "GET SCHEDULE FROM ONE WEEK AGO UP TO TODAY" query
  displayListOfMeetingRoom selectMeetingRoom
  /meetingName /meetingRoomName /meetingDate 3 substitute
  "agenda.name" getChildTag meetingName " agenda" catenate setElementText
  "agenda.preamble.place" getChildTag meetingRoomName setElementText
  "agenda.preamble.date" getChildTag meetingDate setElementText
  "agenda" getChildTag execSGMLEditor
} def %────────────────────────────────────────
/enterAttendants
% [input] tagID [output] (none)
% [funciton] check personel database and display information
%             on display screen, and write information of selected persons
%────────────────────────────────────────
{
  % THE PRESENT TAG POSITION
  /attendantTag exch def
  personnelDB "GET LIST OF PERSONS BELONGING TO THE SAME POST AS OPERATOR" query
  displayListOfPersonsInformation selectPersons
  /name /post /e-mail 3 substitute
  attendantTag "person" addTag /personTag exch def
  personTag ".name" getChildTag name setElementTetx
  personTag ".post" getChildTag post setElementText
  personTag ".e-mail" getChildTag e-mail setElementText
} def
...
```

131a

```
18th project meeting agenda

1: subject:
2: date: Jan. 19, 1998  9:30 - 10:30
3: place: 1st meeting room
4: attendants:
...
```

```
[agenda relationship description]
  %[element name      message name     operator        ]
  %--------------------------------------------------------

["agenda.name"       "Click"  {enterAgendaName}             ]
  ["subject"           "Click"  {enterSubject}                ]
  ["date"              "Click"  {enterDate}                   ]
  ["preamble.date"     "ENTER"  {confirmIfDateIsInPast}]
  ["next_schedule.date""ENTER"  {confirmIfDateIsInFuture}]
  ["place"             "Click"  {enterPlace}                  ]
  ["attendants"        "Click"  {enterAttendants}             ]
  ...
```

FIG. 15

```
[agenda SGML instance]
<agenda>
 <name>18th project meeting agenda</name>
 <preamble>
  <subject></subject>
  <date>Jan. 19, 1998 9:30 - 10:30</date>
  <place>1st meeting room</place>
  <attendants></attendants>
   <person>
    <name>***</name>
    <post>***department</post>
    <e-mail>***@fujitsu</e-mail>
   </person>
   . . .
  </attendants>
 . . .
</agenda>
```

FIG. 17

STRUCTURED DATA MANAGEMENT SYSTEM AND COMPUTER-READABLE RECORDING MEDIUM STORING STRUCTURED DATA MANAGEMENT PROGRAM

BACKGROUND OF THE INVENTION (1) Field of the Invention

The present invention relates to a structured data management system for assisting in generating structured electronic data and a computer-readable recording medium storing a structured data management program, and more particularly to a structured data management system for assisting in generating electronic data for use in variable non-routine services and a computer-readable recording medium storing a structured data management program.

(2) Description of the Related Art

For handling electronic data such as documents, it has been customary to structure the data according to the logical structure of the contents of the data because it would be difficult to make electronic reuse of unstructured document data. For example, it would require a complex analytic process to extract part of contents from an unstructured document to generate a header or refer to another document.

When electronic data is structured and a system is developed for handling the structured electronic data, if the structured electronic data is fixed in data structure, then the system needs to be changed each time the data structure is changed. If a new system should be able to use old data, it has been the common practice to either convert the structure of the old data into a new structure compatible with the new system or design the new system so as to be able to handle both structures of new and old data. One example of such a system and data conflict is often experienced between an HTML (HyperText Markup Language) and a web browser. For example, tags that have been used by a previous HTML are not used by a new HTML, and there is a web browser which defines unique tags of its own.

The practice of changing a system each time the structure of data is changed requires a large expenditure of time and labor at the time the structure of data is changed. Services practiced in companies change from time to time, and the structure of data handled in those services needs to be changed as the services change. In order to be able to change a data structure freely, there has been proposed a means for defining a logical structure to which each item of data is to adapt itself. One example of such means will be described below.

For processing documents, SGML (Standard Generalized Markup Language)/XML (extensible Markup Language) can be used. SGML is a standard for describing documents as stipulated in ISO8879, JIS X4151. XML is a subset of the SGML standard as established by the SGML working group of World Wide Web Consortium. SGML and XML provide a description process for defining a logical structure for documents, known as DTD (Document Type Definition). According to SGML/XML, since the logical structure and layout of a document are separate from each other and the logical structure is clearly indicated by tags in the document, it is easy to process the document with a computer and manage a large amount of data.

SQL (Structured Query Language) can be used to process relational databases. SQL, which is stipulated in JIS X3005, is a database language that is used to define and query relational databases. A schema for a relational database is defined by SQL. The schema is used to define a structure and corresponds to a document type definition for a structured document.

With the process available for defining a logical structure for data, it is possible to electronically process a large amount of data and vary the logical structure of data in response to ever-changing demands.

However, even when SGML which provides the process of defining a logical structure for data is used, if a logical structure is defined by a person and contents of a document are generated by another person, then a problem arises in that semantics of the document may not be unified. Since many more persons are involved in generating a document than persons who define a logical structure therefor, the above problem occurs frequently. As a result, documents may not be generated as intended by persons who have defined the logical structure.

One solution has been to name elements of SGML with definite words. According to another solution, an explanation about how elements of tags of SGML are to be described is described by a clear sentence. These schemes, however, fail to fully eliminate any vagueness about the words and sentences, and also require a large expenditure of time and labor.

SQL provides types, e.g., a number type, a character string type, and a date type, for defining semantics for columns in the definition of a schema for a relational database, and defines contents of types to be written in columns. However, SQL can define contents only in ranges limited by the available types. For example, SQL cannot define an item which designates detailed contents, e.g., writing only past dates except for holidays.

Still another solution to the problem that semantics of a document may not be unified is to use a DynamicHTML which is a descriptive process for making use of an HTML document by joining HTML documents and scripts to each other. More specifically, a script is embedded in a description of an HTML document thereby to generate part of the HTML document dynamically and generate an interactive HTML document. When scripts that define contents of operation of semantics are embedded in parts where elements are written, only descriptions which are not vague can be accepted.

However, if a plurality of expression forms such as HTML documents and scripts are mixed together in one HTML document, as with the DynamicHTML, then both the HTML documents and the scripts cannot easily be read, and cannot be corrected efficiently. For the purpose of describing a service common to HTML documents, scripts may be written in separate files and may be read from scripts of the HTML documents. Since, however, it is not known where and how those scripts are used in the HTML documents, no maintenance can be performed of scripts unless their effect on all the HTML documents is taken into account. According to the DynamicHTML, because scripts are scattered in HTML documents and related to each other, even if some of the scripts are corrected, the effect of the correction on all the scripts must be considered.

SUMMARY OF THE INVENTION

It is an object of the present invention to provide a structured data management system which is capable of generating electronic data such that the definition of a logical structure can easily be changed and that semantics described in data which matches a defined structure is as intended by a person who has defined the structure.

Another object of the present invention is to provide a computer-readable recording medium storing a structured data management program which is capable of enabling a computer to perform a process of generating electronic data such that the definition of a logical structure can easily be changed and that semantics described in data which matches a defined structure is as intended by a person who has defined the structure.

To achieve the above objects, there is provided a structured data management system for processing structured electronic data. The structured data management system comprises management object holding means for holding a management object composed of a contents model defining a structure of data to be managed, a contents description describing data to be managed according to the contents model, and an operation description related to the contents model and describing processing contents corresponding to the data in the contents description, and monitoring means responsive to a request with respect to the management object, for processing the management object according to the operation description and monitoring the contents description so that the contents description will not depart from the definition of the contents model.

The above and other objects, features, and advantages of the present invention will become apparent from the following description when taken in conjunction with the accompanying drawings which illustrate a preferred embodiment of the present invention by way of example.

BRIEF DESCRIPTION OF THE DRAWINGS

FIG. 4 is a view of a document for generating an order slip, written in a DynamicHTML;

FIG. 8 is a view showing an example of a comparison of scripts for acquiring contents of an SGML instance;

FIG. 11 is a view showing an example of a script for writing a document generation date;

FIG. 12 is a view showing an example of a DTD for generating an agenda and an SGML instance;

FIG. 13 is a view showing an example of an operation description for generating an agenda;

FIG. 14 is a view showing contents displayed after a start operator is executed;

FIG. 15 is a view showing an example of a description of the relationship between DTD and an operation description;

FIG. 17 is a view showing an SGML instance where information of attendants is added;

DESCRIPTION OF THE PREFERRED EMBODIMENT

Figure 1:
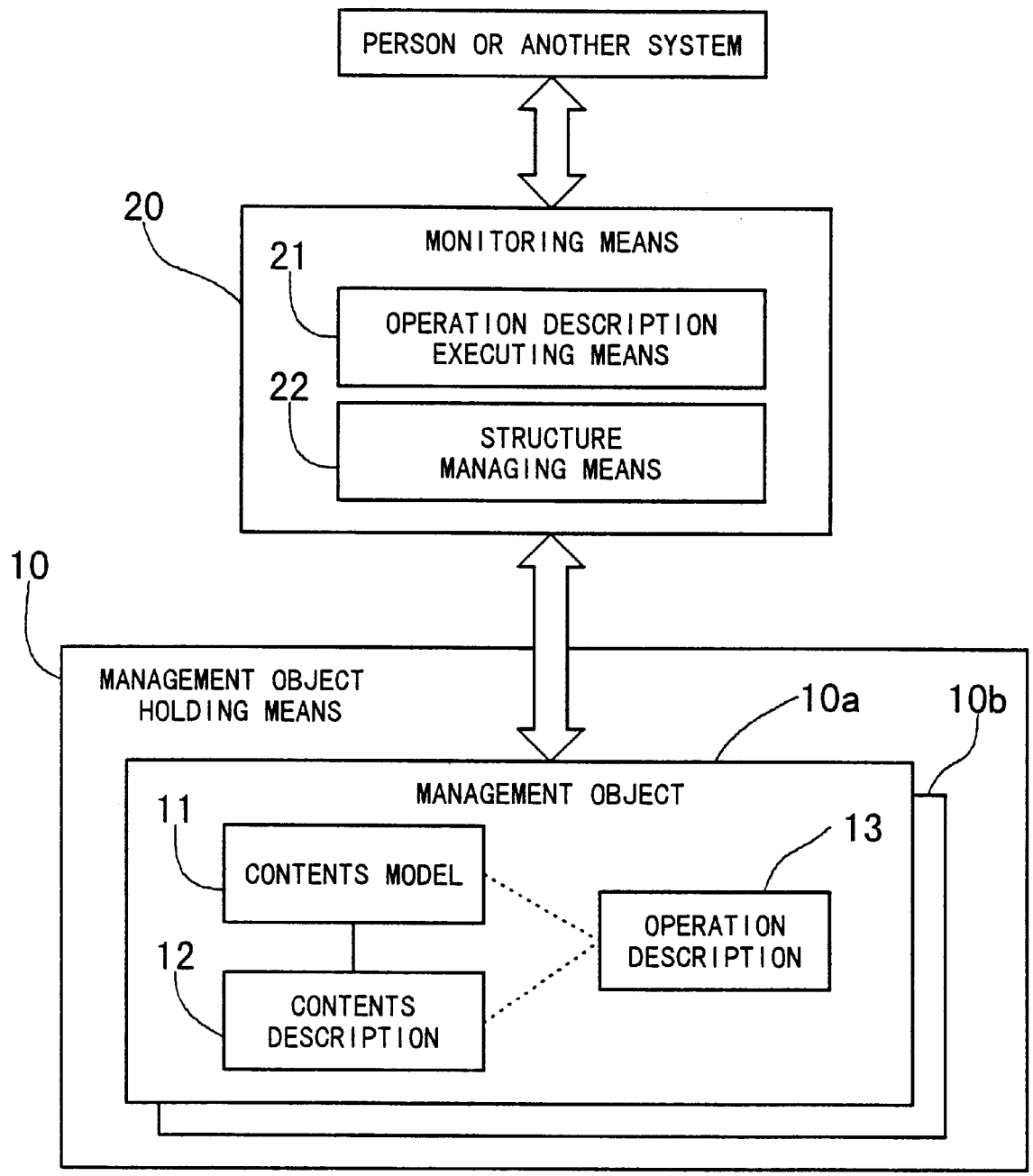
FIG. 1 is a block diagram illustrating the principles of the present invention.

FIG. 1 shows in block form the principles of the present invention. As shown in FIG. 1, a structured data management system according to the present invention comprises a management object holding means 10 and a monitoring means 20.

The management object holding means 10 holds a plurality of management objects 10a, 10b each containing a contents model 11, a contents description 12, and an operation description 13 which are conceptually put together for concurrent management. The contents model 11 defines an internal structure of the contents description 12 which is a description of data to be managed. The contents description 12 describes management data according to the contents model 11. The operation description 13 describes behaviors of the data in the contents description 12, i.e., processing related to the data. The operation description 13 is coupled to the contents model 11 or the contents description 12, and manipulates the data in the contents description 12 depending on the structure of the data in the contents description 12. The operation description 13 functions to define semantics of each the of elements of the internal structure defined by the contents model 11, and to perform services accompanying the elements. Furthermore, the operation description 13 carries out services accompanying the elements of the contents description 12 and inherent in the contents description 12.

The monitoring means 20 serves to call an operation description executing means 21 and a structure managing means 22 in response to a request from the user or another system to a management object. Based on message information received from a GUI (Graphical User Interface) or the other system, the operation description executing means 21 determines, reads, interprets, and executes the operation description 13 which is coupled to the contents model 11 or the contents description 12 that is indicated by the message information. The structure managing means 22 interprets the contents model 11 and verifies and manages the contents description 12 according to the contents model 11.

In the structured data management system, the definition of rules (the operation description 13) made by the user and the processing system (the monitoring means 20) which operates based on the rules are separate from electronic data to be managed. The operation description 13 which is the definition of rules is expressed using a single readable language (script language). A setup for structuring data, separating the contents model 11 which defines the structure of the structured data and the contents description 12 which is the actual description of the data from each other, describing them in a single expression form, and defining semantics and services described in each of elements of the structure, and a setup for easily achieving the definition of interactions between the user and the contents description 12 are accomplished by relating the contents model 11 and the operation description 13 to each other or relating the contents description 12 and the operation description 13 to each other. In this manner, the maintenance of the contents description 12 which depends on a human system and the operation description 13 which depends on a mechanical system can be carried out on a real-time basis.

Advantages offered by the present invention will be described below with respect to specific examples.

First, the present invention is effective to eliminate the vagueness of the definition of semantics.

Figure 2:
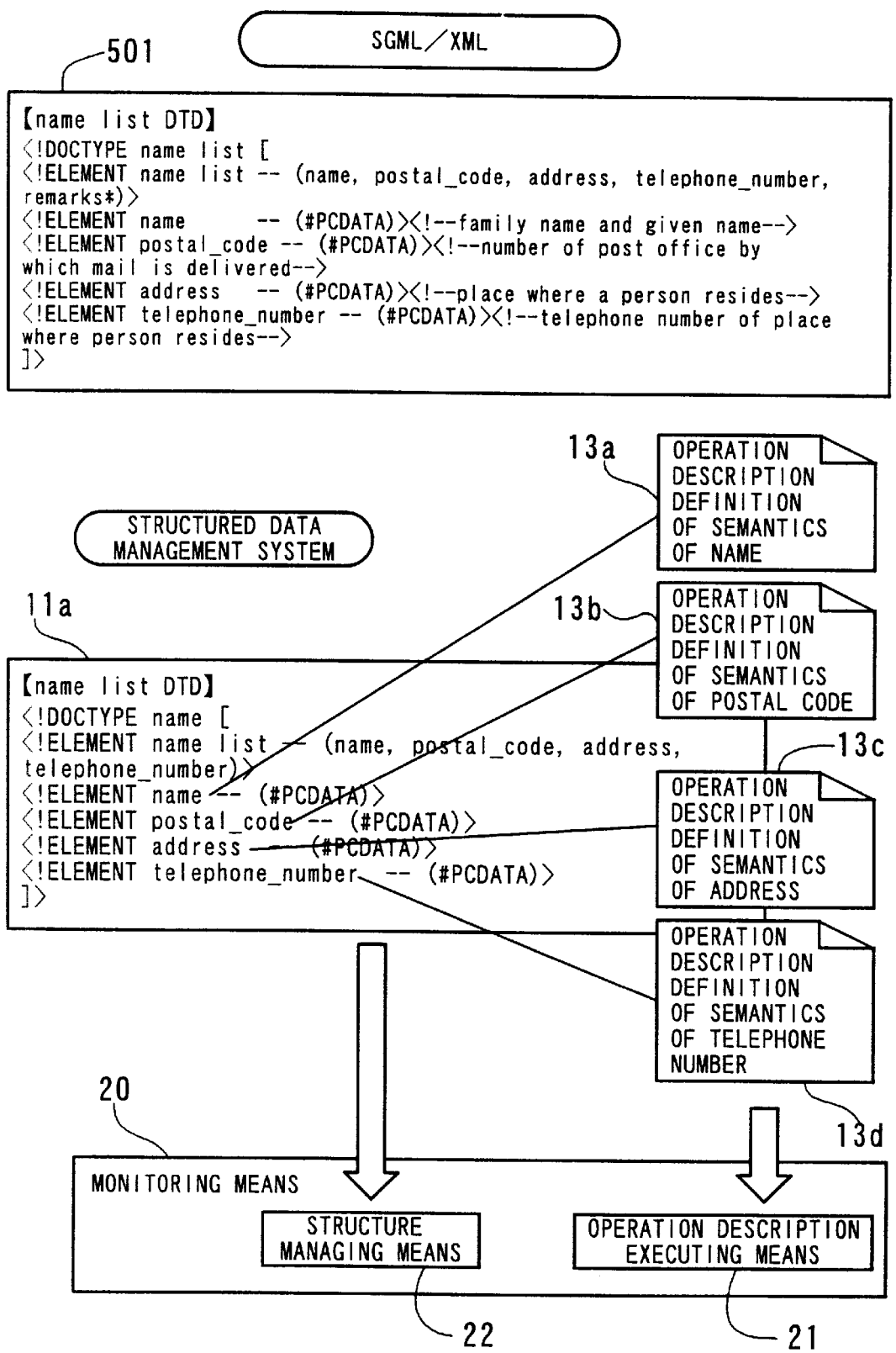
FIG. 2 is a diagram illustrating a means for eliminating the vagueness of the definition of semantics.

FIG. 2 illustrates a means for eliminating the vagueness of the definition of semantics.

FIG. 2 shows in an upper side thereof a means for eliminating the vagueness of the definition of semantics when conventional SGML/XML is used, and also shows in a lower side thereof the means for eliminating the vagueness of the definition of semantics according to the present invention.

In the conventional SGML/XML, element names (tag names) which are free of vagueness are applied in a contents model 501 in order to eliminate the vagueness of the definition of semantics. Furthermore, comments (descriptive statements) which are free of as much vagueness as possible are added to prompt the user to enter unified semantics. For example, a comment "family name and given name" is added with respect to an element "name". However, since some vagueness still remains unremoved and the comment is not binding, any wrong data cannot be verified when it is entered.

According to the present invention, the definitions of semantics of data of contents descriptions for and services for assisting in entering elements of the structure in a contents model 11a are prepared as operation descriptions 13a–13d by scripts, and these operation descriptions 13a–13d are coupled to the respective elements of the contents model 11a or the elements of the contents descriptions. When the entry of the elements is assisted by the operation descriptions corresponding to those elements, the person who generates the data can understand what is to be written in the elements of the data structure. The operation descriptions 13a–13d enable the operation description executing means 21 to automatically determine whether the semantics of the data is suitable for the elements of the described structure and also to assist the user by displaying a list of contents to be described for the user to choose from. As a result, human errors are eliminated in the generation of electronic data.

According to the present invention, furthermore, the structured data management system is free of trouble due to the multiple definition of semantics. In the conventional SGML/XQL or SQL, a process of verifying the defined semantics of each element is incorporated in each application. Since contents of the verifying processes differ from each other, the semantics differ from application to application. If the semantics are to be modified, then all the applications have to be modified.

Figure 3:
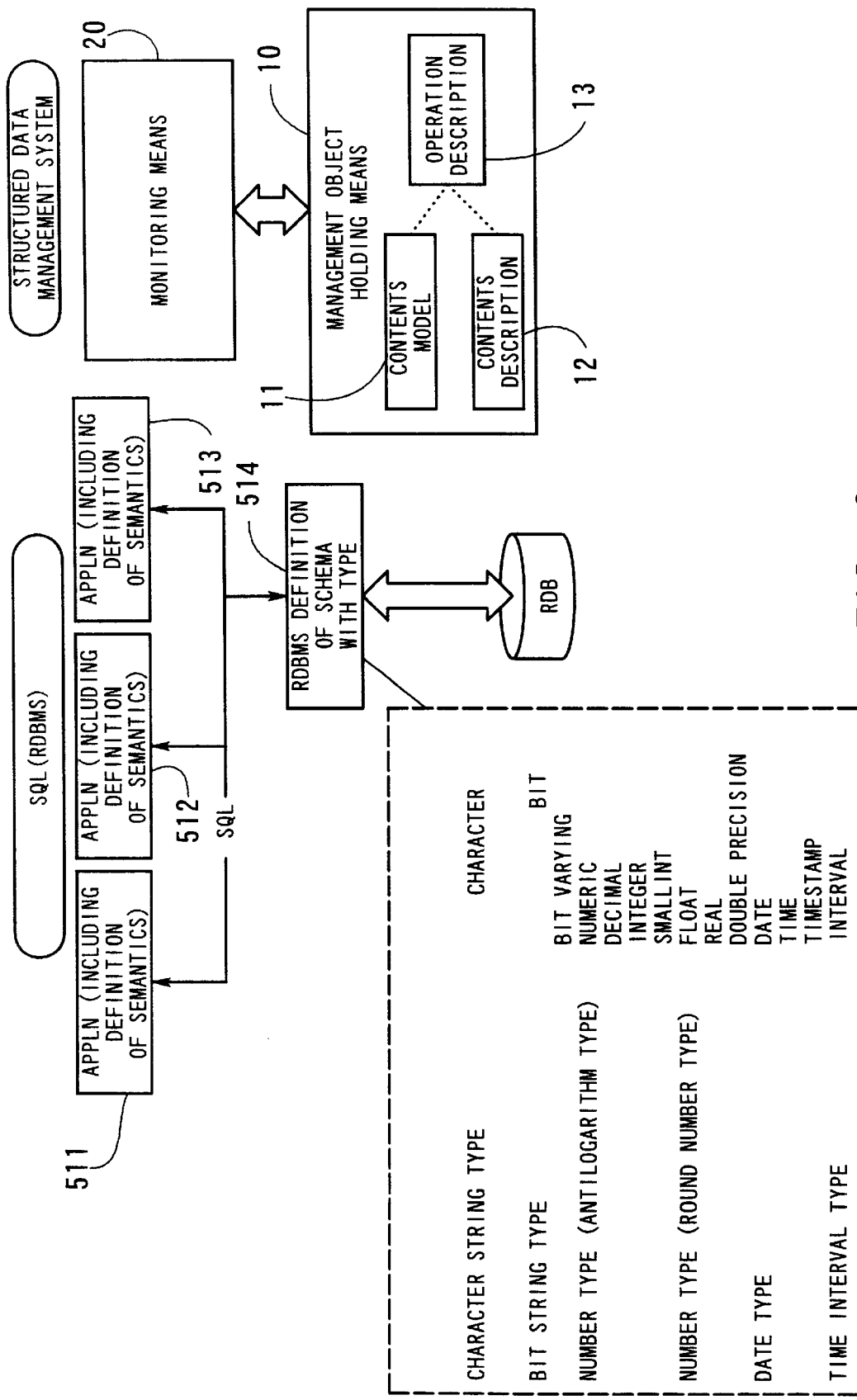
FIG. 3 is a diagram illustrating the multiple definition of semantics.

FIG. 3 illustrates the multiple definition of semantics. FIG. 3 shows the definition of semantics according to the conventional SQL in its left side and the definition of semantics according to the present invention in its right side.

As shown in FIG. 3, according to conventional RDBMS (Relational DataBase Management System), a schema definition 514 according to type is performed in the RDBMS, and semantics are defined on application programs 511–513. In some cases, the definition of semantics may be incorporated without being recognized by the persons who generate the application programs.

According to the present invention, the contents model 11 and the operation description 13 are coupled to each other, and the semantics are defined in the operation description 13. Since these are interpreted as a single management object by the monitoring means 20, it is not necessary for an individual application to incorporate a process of defining semantics on its own. As a result, for changing the semantics, it is not necessary to change all the applications, but only contents of the operation description may be changed.

According to the present invention, furthermore, contents of portions relative to the document structure and the operation description can easily be understood. For example, a process of assisting in generating an order slip for on-line ordering of goods will be considered.

FIG. 4 shows a document for generating an order slip, written in a DynamicHTML. It is possible in a DynamicHTML 520 to relate an operation description to a certain element in a structured document.

Figure 5:
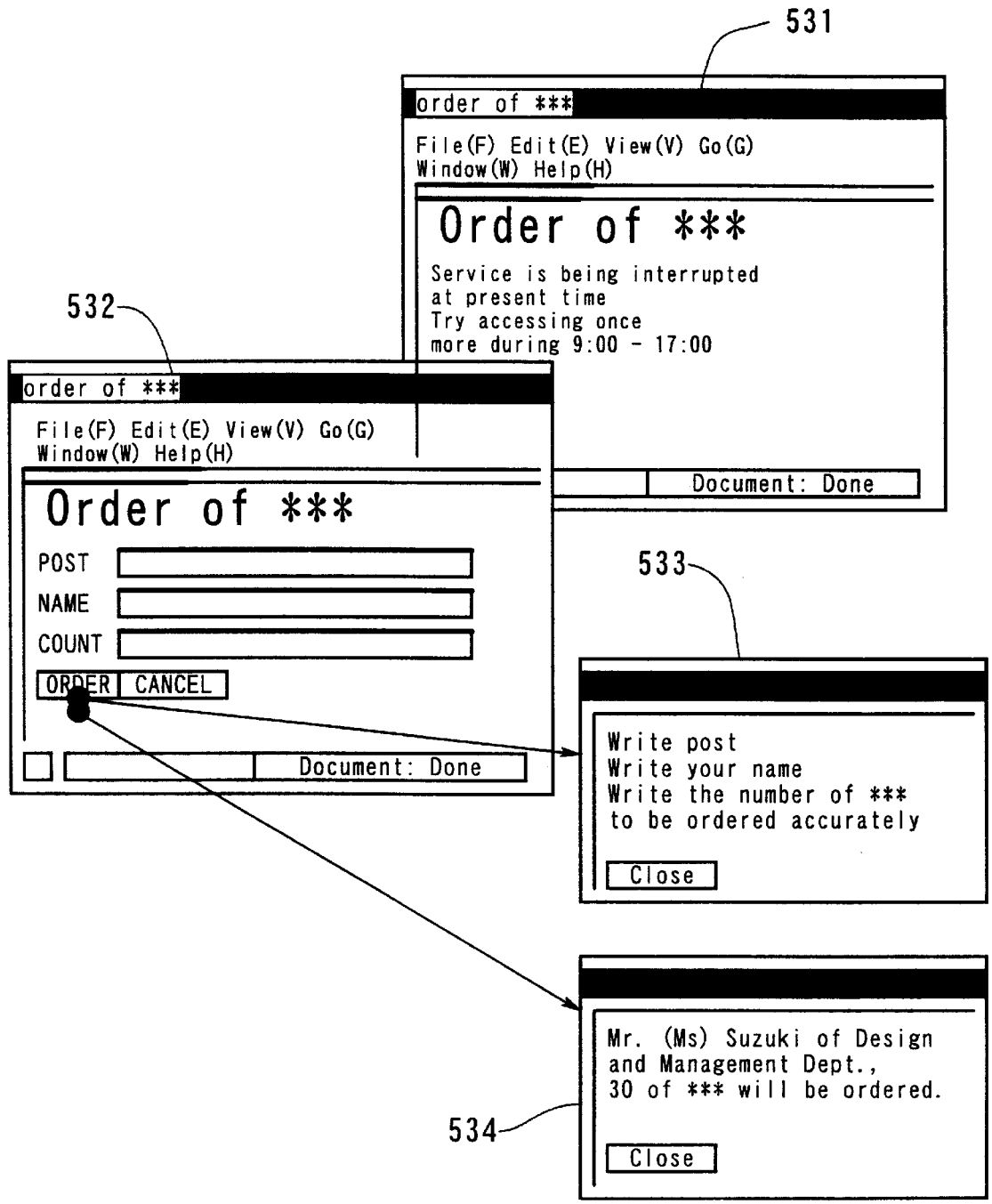
FIG. 5 is a view of an example of screen images for assisting in generating an order slip.

FIG. 5 shows an example of screen images for assisting in generating an order slip. These screen images are displayed on a user's display unit when the DynamicHTML 520 shown in FIG. 4 is executed. In the example shown in FIG. 5, when a request for displaying a screen image for assisting in generating an order slip is received, it is decided whether the present time is within a service time. If the present time is not within the service time, then a screen image 531 representing an announcement of that fact is displayed. If the present time is within the service time, then a screen image 532 for generating an order slip is displayed. The screen image 532 contains items for entering "post", "name", and "number". When necessary information is entered into these items and a button "order" is pressed, a command for generating an order slip is issued. The semantics of the entered information are verified. If the semantics are not legitimate, then a screen image 533 for prompting proper entry is displayed. If the semantics are legitimate, then a screen image 534 containing a message indicative of the order of the goods is displayed.

Vagueness of semantics can be eliminated by the DynamicHTML 520. As shown in FIG. 4, the DynamicHTML 520 contains a plurality of expression forms such as HTML documents and scripts that are mixed together as nested structures in one document. Consequently, the contents of the HTML documents and the content of the scripts cannot easily be read.

Figure 6:
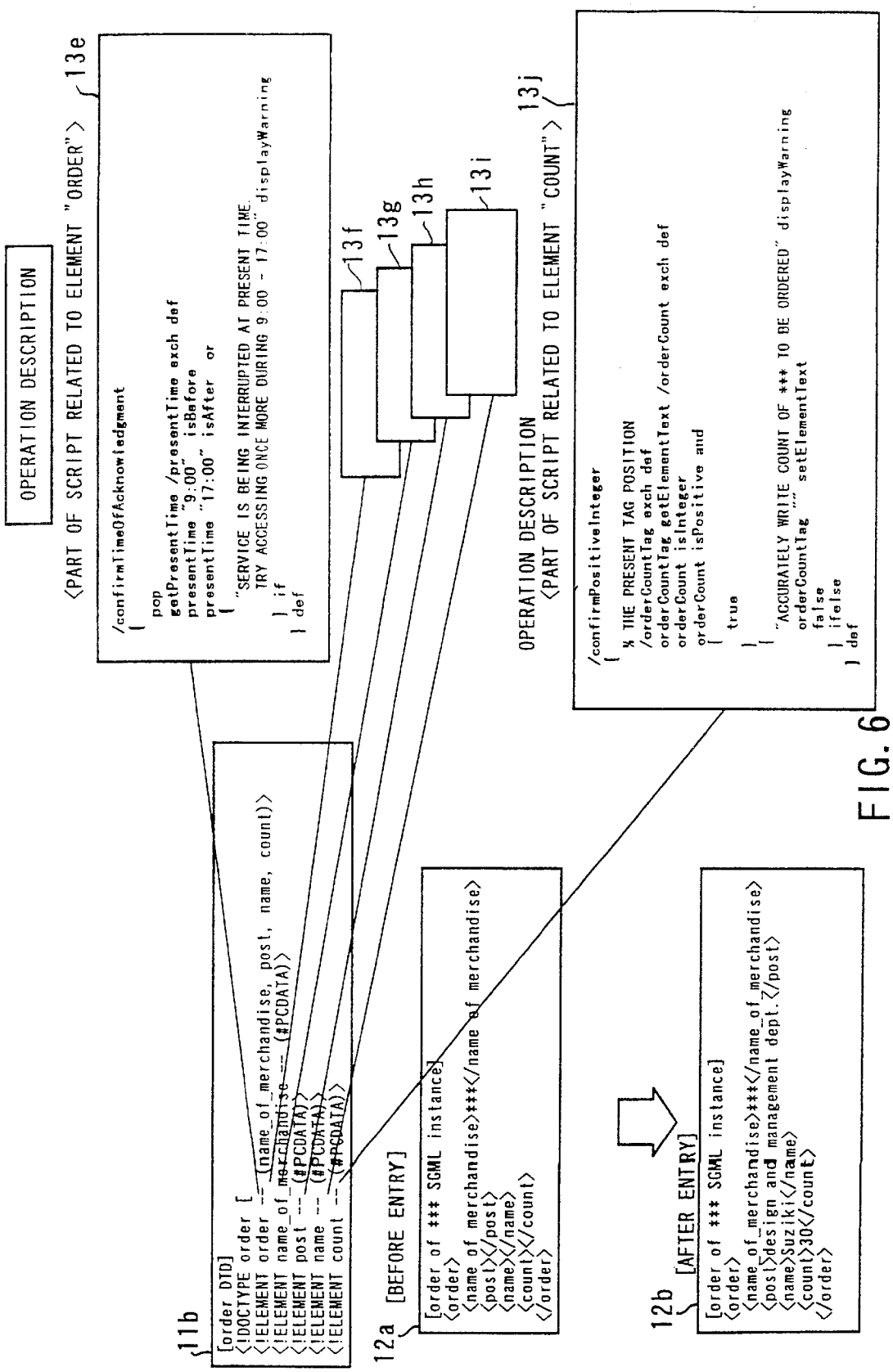
FIG. 6 is a view of an example of management objects for generating an order slip.

For assisting in generating the same order slip according to the present invention, management objects are generated as follows:

FIG. 6 shows an example of management objects for generating an order slip according to the present invention. As shown in FIG. 6, a contents model 11b defining a document form for an order, a contents description 12a of a document structure according to the contents model 11b, and operation descriptions 13e–13j related to elements in the contents model 11b are used as management objects. In the operation descriptions 13e–13j, the definition of semantics of data of the contents description of the elements and the contents of an entry assistance service are described by scripts. When the scripts are executed by the monitoring means, the contents description 12a representing a desired order slip is obtained.

Since the data and the behavior of the data are separate from each other, a plurality of expression forms are not mixed in a series of descriptions. Consequently, the data and the scripts can easily be read and their maintenance is made easy. These advantages manifest themselves particularly when the amount of descriptions of a document is increased.

Figure 7:
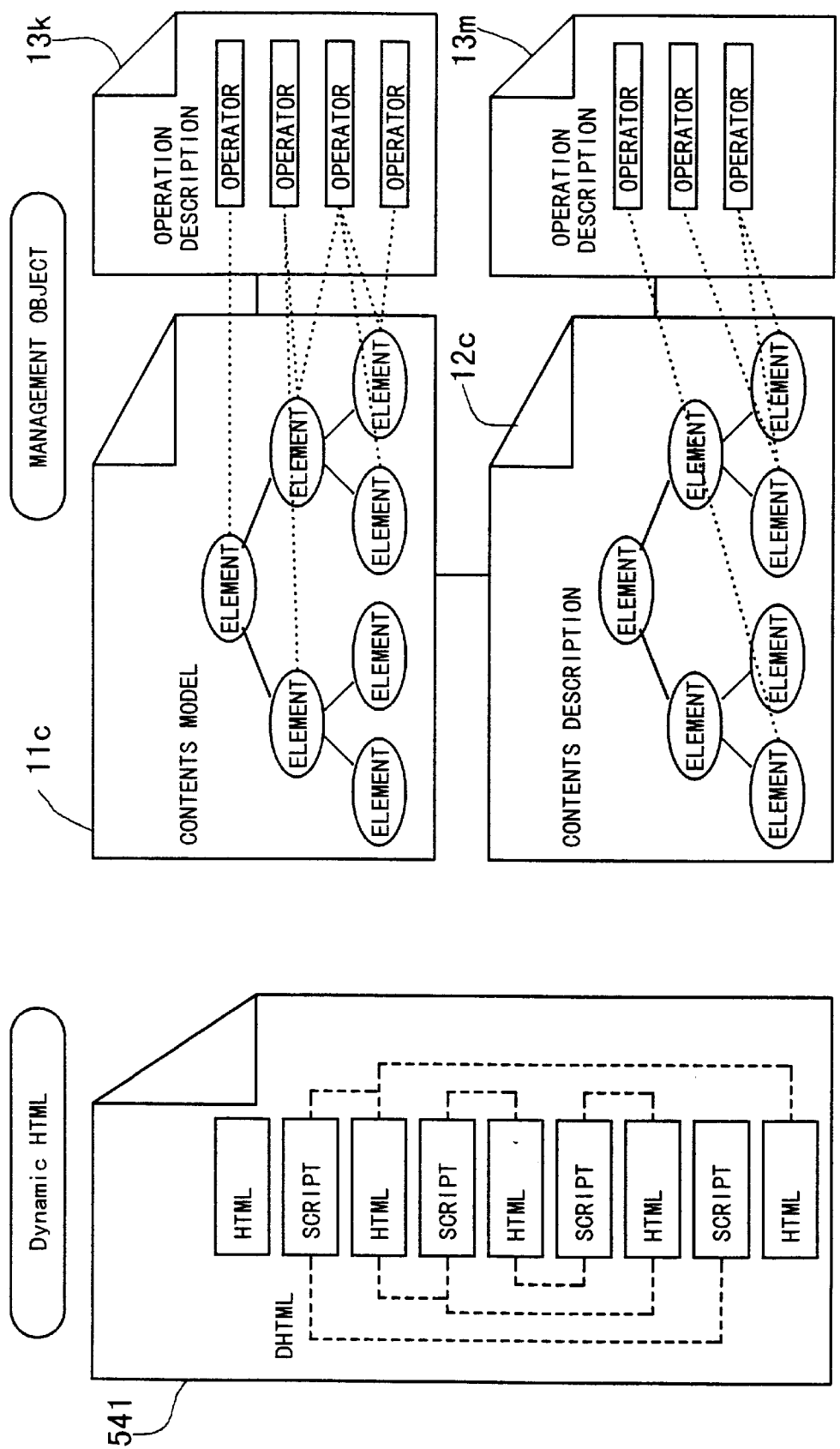
FIG. 7 is a diagram showing the relationship between data and scripts.

FIG. 7 shows the relationship between data and scripts. FIG. 7 shows a DynamicHTML 541 in its left side and management objects according to the invention in its right side.

The DynamicHTML 541 contains a mixture of descriptions according to the HTML and descriptions according to scripts. It is not clear which script manipulates which HTML (though the correspondence therebetween is indicated by dotted lines, there is no actual information representing the correspondence). With the management objects according to the invention, each script (also referred to as an operator) of an operation description 13k associated with an object model 11c is clearly associated with elements of the object model 11c.

Similarly, each script of an operation description 13m associated with a contents description 12c is clearly associated with elements of the contents description 12c. The contents description 12c can be manipulated from the operation description 13m by, for example, issuing an instruction to the structure managing means using a locator description such as an Xpointer.

In this manner, the connection between a structure defined by a contents model or a structure of a contents description and an operation description is definitely indicated, making clear a range in which a change in the contents model or the operation description affects others.

According to the present invention, because the contents model 11 and the operation description 13 are coupled to each other, a service common to a number of contents descriptions 12 according to the same contents model 11 can be described. Heretofore, a service common to data having the same structure has been coded in system hardware. Therefore, when the data structure is changed or the common service needs to be changed due to a change in the data structure, the system has to be built again. According to the present invention, however, since the service common to the data having the same structure is located as the operation description 13 outside of the monitoring means 20, the service can easily be changed. Furthermore, inasmuch as the operation description 13 is coupled to each element in the contents model 11 and is not related to other operation descriptions, it can partly be changed without taking all the operation descriptions into account. Therefore, the work can easily be distributed, and maintenability is increased.

According to the present invention, moreover, because the contents model 11 and the operation description 13 are coupled to each other, a service peculiar to an instance can be prepared as the operation description 13 and used. Thus, there can be prepared a service peculiar to the contents description 12 rather than the operation description 13 as a common service coupled to the contents model 11. In this fashion, the operation description 13 can be changed without affecting a service to the other contents description 12 which is the same contents model 11.

According to the present invention, furthermore, the definition of semantics of data of the contents description 12 with respect to each element of the structure in the contents model 11 and the entry assistance service are described as the operation description 13 by the script language, rather than being coded in the hardware of the monitoring means 20. This allows the user to easily understand contents of processing and to define a service on its own. The time required by maintenance can be reduced. By separating the contents description 12 and the operation description 13 from each other, a plurality of languages are not mixed and present in the same file, as is the case with the DynamicH-TML. Therefore, no confusion arises upon maintenance, and the behavior can be changed quickly as the contents of the service change, thus assisting a system in an environment in which the object suffers many changes, e.g., non-routine services.

According to the present invention, in addition, the contents model 11, the contents description 12, and the operation description 13 are handled logically concurrently. Even when the user's request changes due to a change in the environment, resulting in a change in the definition of the structure of the contents model 11 and the behavior of the operation description 13, the existing contents description 12 can be assisted by the existing contents model 11 and the existing operation description 13. If the monitoring means 20 exists in a distribution destination, then the management objects 10a, 10b can be distributed in relation thereto.

According to the present invention, moreover, the structure managing means 22 for managing the structure of the contents description 12 by checking if it is defined by the objects model 11, and the operation description executing means 21 for processing the operation description 13 which verifies services and semantics with respect to the contents description 12 are divided as separate processes, so that when the contents description 12 is rewritten in the operation description 13, it is not necessary to write data so as to shape and output the data according to the contents model 11. For reading the contents description 12, data behaviors can be described in the operation description 13 such that a structure may be designated and data of each element may be read, and complex processing relative to the structure may not be described in the operation description 13.

FIG. 8 shows an example of a comparison of scripts for acquiring contents of an SGML instance. In this example, scripts are illustrated which extract a generation date from a contents description 12d generated according to a contents model 11d shown in FIG. 8.

In a script 550 which uses no structure analyzing means, it is necessary to analyze the structure of the contents description 12d and also describe a very long processing sequence in order to reach desired data.

In a script 13n which uses a structure analyzing means, however, desired information can simply be designated without describing a complex process relative to the structure of the contents description 12d. The structure of the contents description 12d is analyzed by the structure managing means 22.

The monitoring means 20 and the management object holding means 10 are separate from each other, and the description of data itself and its structure and descriptions about behaviors of the data are held as management objects in the management object holding means 10. A portion for executing scripts that are not affected by changes in the processing contents, defining the definition of the structure of the data, and managing the contents of the data are used as the monitoring means 20. The contents of behaviors in the present system are thus clearly divided as a portion depending on requests from the user and a portion not depending on requests from the user. Therefore, a portion which is changed according to requests from the user and a process which is not changed by requests from the user are clearly distinguished from each other, allowing requests from the user to be quickly reflected in the system. The monitoring means 20 is capable of managing various management objects with the same architecture.

When the structured data management system according to the present invention is applied to a service assisting system for assisting in data processing relative to services in companies, various services can be performed efficiently. A service assisting system to which the present invention is applied will be described below.

Figure 9:
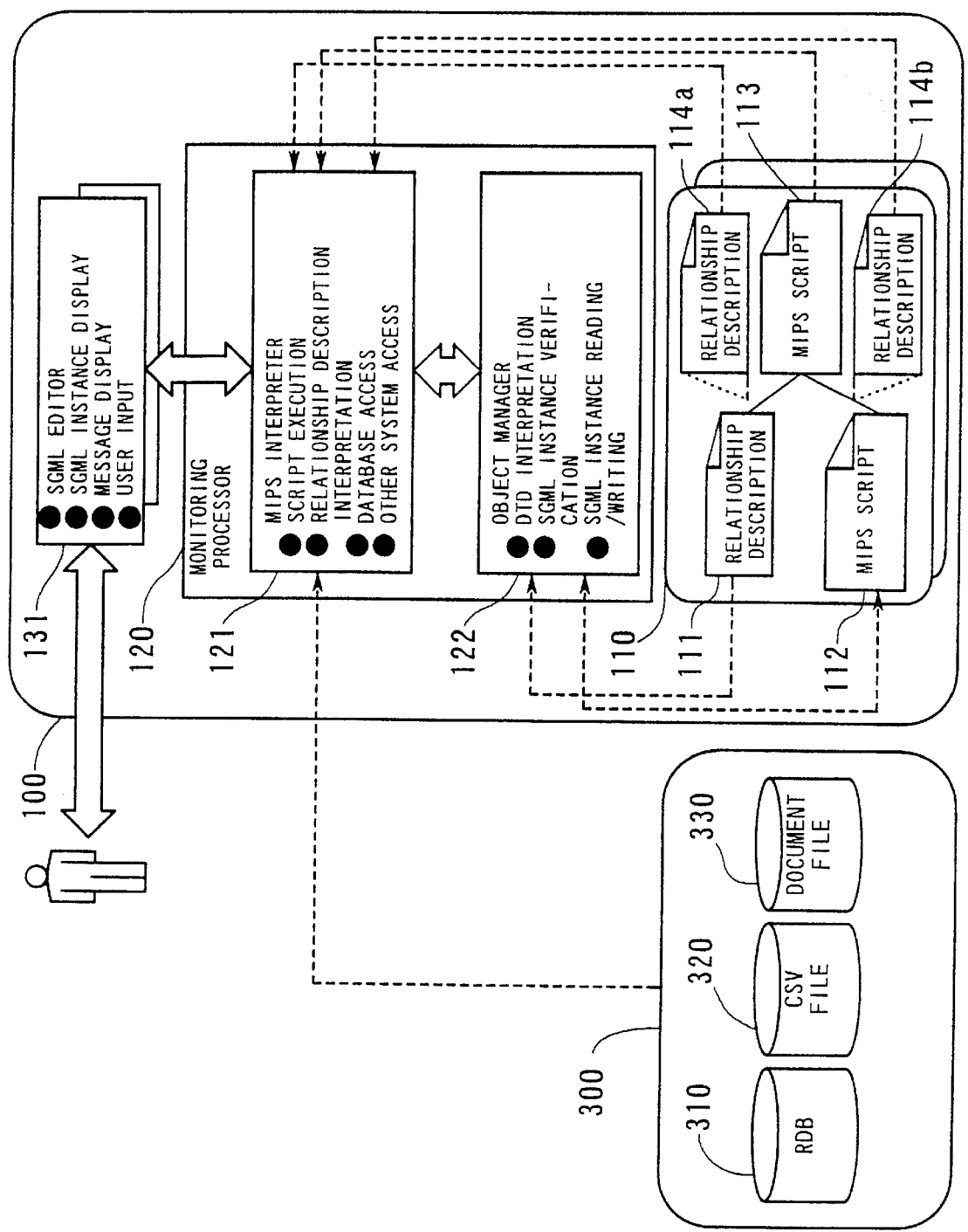
FIG. 9 is a block diagram of a service assisting system.

FIG. 9 shows in block form a service assisting system. The illustrated service assisting system is a service assisting system 100 for managing structured electronic documents. The service assisting system 100 comprises management objects 110, a monitoring processor 120, and an SGML editor 131.

Electronic documents to be managed are managed as the management objects 110. Each of the management objects 110 comprises a data type definition (DTD) 111, SGML instances 112, a MIPS script 113, and relationship descriptions 114a, 114b.

Electronic documents are structured and described by the SGML which serves as global standard description specifications for structured electronic documents. The contents model 11 shown in FIG. 1 corresponds to the DTD 111 according to the SGML specifications, and the contents description 12 to the SGML instances 112.

The MIPS script 113 corresponds to the operation description 13 shown in FIG. 1, and is a script described by the MIPS (MicroPost Script) language. The MIPS language is a script language having language specifications for Japanese expressions for allowing persons who use or correct scripts to easily understand what processing is carried out by the script.

Operators which are operation execution instructions of the MIPS script 113 include a start operator executed when a management object 110 is read, an end operator executed when a management object 110 is ended, and operators for carrying out processes corresponding to elements of the SGML instances 112. The operators for carrying out processes corresponding to elements include operators related to definitions relating to elements of DTD 111, and operators related to elements of the SGML instances 112. Contents described in the MIPS script 113 include, for example, generation, correction, and display of the SGML instances 112, access to a database 300, and starting and ending of other systems 131. It is thus possible to access a database storing information of persons for eliminating errors at the time of writing names and posts of persons.

Each of the relationship descriptions 114a, 114b is a table composed of a set of three items, i.e., names of SGML elements, names of messages, and names of operators. When a person or another system sends a message to an element of an SGML instance 112, the relationship descriptions 114a, 114b identify the name of the element and an operator in the MIPS script 113 which corresponds to the message. The identified operator is then executed by a MIPS interpreter 121.

The relationship description 114a is a relationship description relative to the DTD 111, and the relationship description 114b is a relationship description relative to the SGML instances 112. The relationship description 114a relative to the DTD 111 is used commonly by the SGML instances 112 according to the DTD 111, and serves to couple them to an operator which defines semantics of their elements. When an operator is peculiar to a certain element of an SGML instance 112, the relationship description 114b relative to the SGML instance 112 serves to couple the element to the operator.

Each of the relationship descriptions 114a, 114b may not be composed of a set of three items, but may contain names of elements and names of operators which are related to each other. For example, each of the relationship descriptions 114a, 114b may be a table composed of pairs of names of elements and names of operators, and when an element of an SGML instance 112 is clicked with a mouse, a list of operators coupled to the element may be displayed for the user to choose from. Each of the relationship descriptions 114a, 114b is not limited to one DTD 111 and one SGML instance 112. For example, a plurality of sets of the relationship descriptions 114a, 114b may be prepared which depend on purposes, e.g., document generation, review, approval, storage, distribution, updating, and reference, and also on persons in charge.

The monitoring processor 120 has a MIPS interpreter 121 and an object manager 122, and controls them.

The MIPS interpreter 121 corresponds to the operation description executing means 21 shown in FIG. 1. Specifically, when the user enters a message with respect to an element of an SGML instance 112 using the SGML editor 131, the MIPS interpreter 121 interprets the relationship descriptions 114a, 114b, and selects an operator of the MIPS script 113 to be executed relative to the received message. The MIPS interpreter 121 then interprets and executes the selected operator. The MIPS interpreter 121 has functions necessary to interpret and execute the MIPS script 113. For example, the functions include a function to access the database 300, a function to cooperate with other systems, and a function to instruct the object manager 122 which manages the SGML to read and write the SGML instance 112.

The object manager 122 corresponds to the structure managing means 22 shown in FIG. 1. The object manager 122 interprets the DTD 111, verifies whether an SGML instance 112 is in accord with a structure defined by the DTD 111, and changes the SGML instance 112 while keeping the structure defined by the DTD 111 in response to an instruction from the MIPS interpreter 113 to change the SGML instance 112. For reading the SGML instance 112, the object manager 122 provides the MIPS interpreter 121 with a function to designate a structure and read a document of each element.

The SGML editor 131 gives the user an input environment for information to be entered into the monitoring processor 120. Specifically, the SGML editor 131 displays SGML instances and various messages received from the monitoring processor 120 on the screen of a display unit used by the user, receives a user input from an input unit, and transfers the received information to the monitoring processor 120.

Structured documents to be processed are stored in the database 300. The database 300 stores various kinds of data. For example, the database 300 stores an RDB (Relational DataBase) 31, a CSV (Comma Separated Value) file 320, and a document file 330.

Figure 10:
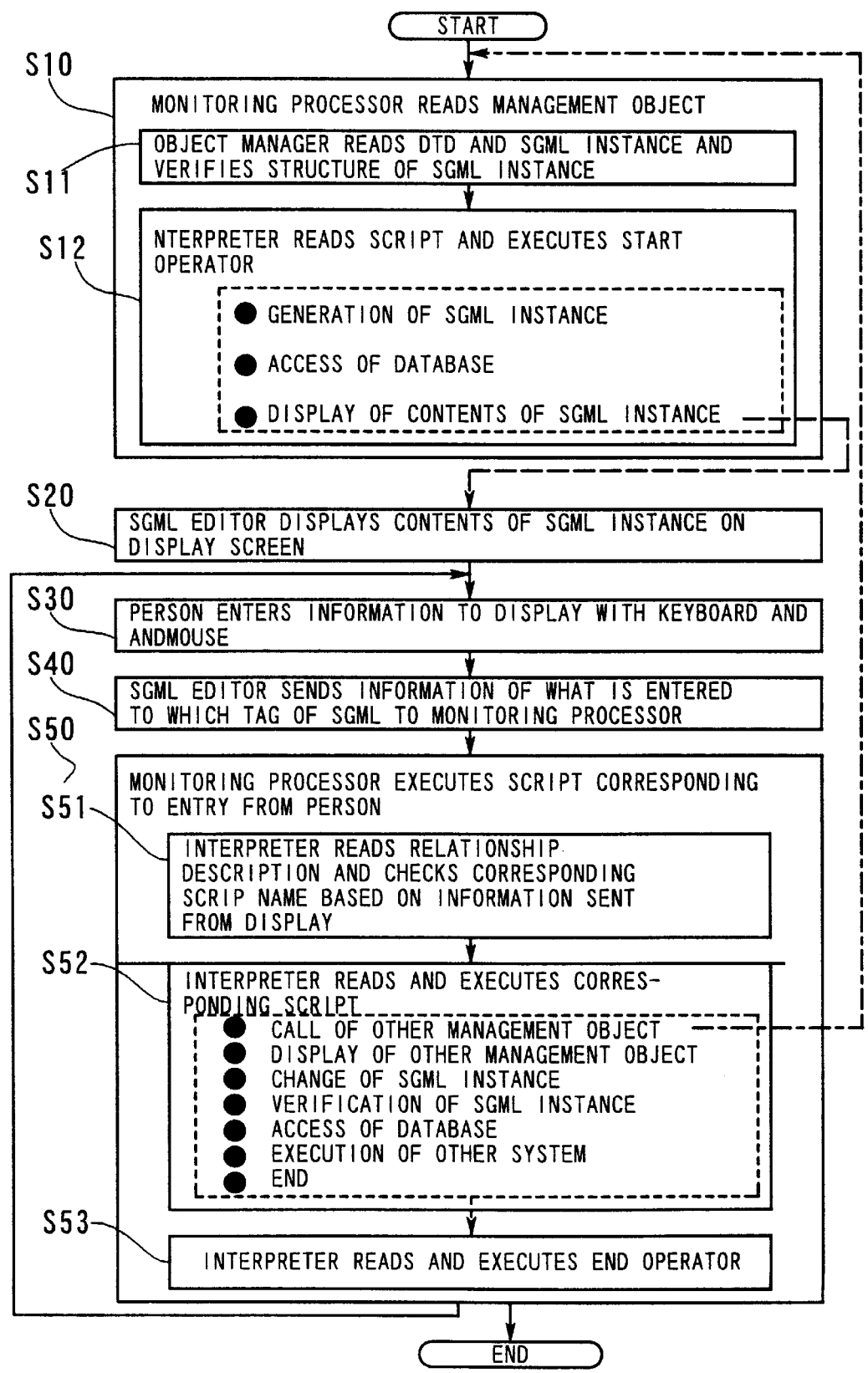
FIG. 10 is a flowchart of a processing sequence of the service assisting system.

FIG. 10 shows a processing sequence of the service assisting system. In FIG. 10, numerals with a prefix S indicate step numbers.

The processing sequence is basically carried out as follows: First, the monitoring processor 120 reads a management object 110 in step S10. Then, the SGML editor 131 displays the contents of a document in step S20. The user enters an instruction to the SGML editor 131 in step S30. The entered instruction is sent from the SGML editor 131 to the monitoring processor 120 in step S40. In response to the instruction, the monitoring processor 120 executes the MIPS script 113 in step S50.

The processing in each step will be described in detail below.

In step S10, the object manager 122 reads the DTD 111 and the SGML instance 112 of SGML, and verifies whether the SGML instance 112 is in accord with a structure defined by the DTD 111 in step S11. Then, the MIPS interpreter 121 reads and executes a start operator of the MIPS script 113 in step S12. When the start operator is executed, the monitoring processor 120 operates as follows: First, the monitoring processor 120 accesses the database 300, collects information therefrom, and rewrites the SGML instance 112 based on the collected information. Then, the monitoring processor 120 sends contents of the SGML instance 122 to the SGML editor 131, and displays the SGML instance 122 on the display unit.

The SGML editor 131 displays the contents of the SGML instance sent from the monitoring processor 120 on the screen of the display unit in step S20.

Then, when the user moves a cursor, enters characters, and clicks the mouse on the SGML editor 131 in step S30, the SGML editor 131 sends information indicative of what event is performed on which element (tag) of SGML to the monitoring processor 120 in step S40.

In the monitoring processor 120, the MIPS interpreter 121 checks a corresponding operator name of the MIPS script 113 from the relationship descriptions 114a, 114b based on the information indicative of the element name and the event type (a keyboard code, a mouse click or double click) sent from the SGML editor 131 in step S51, and executes the operator in step S52. At this time, the MIPS interpreter 121 checks the relationship description 114b for the SGML instance. If there is an item corresponding to the table thereof, then the MIPS interpreter 121 executes the operator thereof. If there is no item, then the MIPS interpreter 121 checks the relationship description 141a for the DTD. If there is an item corresponding to the table thereof, then the MIPS interpreter 121 executes the operator thereof. If both items are not present, then the MIPS interpreter 121 does nothing.

The MIPS script 113 describes a change in the SGML instance 112, a verification as to whether the SGML instance 112 has a description of the contents depending on the element, a display of an SGML instance 112 in another management object 110, a call of another management object 110, an exchange with the database 300, an execution of another system, and a call of an end operator. When another management object is called, the same sequence as described above is concurrently performed as another process. When an end operator is called, the MIPS interpreter 121 reads and executes the end operator in step S53.

By thus relating the DTD 111 and the MIPS script 113 to each other, it is possible to define semantics described in a document. Specifically, while the SGML specifications provide a process of defining the structure of a document described in the SGML instance 112, they do not provide a process of defining semantics described in the document. Therefore, for generating the DTD 111, it has required a large expenditure of labor to select words that are not vague in determining the name of an element of a structure and also to clearly describe a document for explaining what meaning such an element has.

In the service assisting system according to the present invention, the MIPS script 113 for assisting in describing each element of the structure of a document is provided as a process of defining semantics described in the document. This script makes it possible to define the structure of the document and semantics described in each element of the structure, and also to provide services such as for retrieving information and assisting in entering information.

FIG. 11 shows an example of a script for writing a document generation date. For an element for writing the generation data of a document, a MIPS script 113a is provided to determining a date at which a document is being generated and writing the date in the element. The MIPS script 113a ensures that the date at which the document is being generated will be written in the element of the generation date without fail. Since the generation date is automatically written and the person who is generating the document is not required to write the generation date, the work involved in generating the document can be reduced.

The object manager 122 dedicated for managing structures of documents, models of data and processing of data can clearly be separated from each other, making it unnecessary to write descriptions of models of data in scripts. For example, it is not necessary to write descriptions for shaping and outputting contents to protect data structures in scripts.

Furthermore, as the object manager 122 provides a function to designate a structure and read a document of each element, it is not necessary to write a script to repeat a search for an element name from the start of the SGML instance 112 when contents are read from SGML instance 112.

A processing sequence of the service assisting system for generating the agenda for a meeting will be described below using the step numbers shown in FIG. 10.

FIG. 12 shows an example of a DTD for generating an agenda and an SGML instance.

First, the monitoring processor 120 reads a management object dealing with an "agenda" document as shown in FIG. 10 in step S10. Specifically, the object manager 122 reads the DTD 111c and the SGML instance 112c, and checks the structure of the SGML instance 112c in step S11. If the object manager 122 confirms that the structure of the SGML instance 112c is correct, a start operator is executed in step S12.

FIG. 13 shows an example of an operation description for generating an agenda. In a MIPS script 113c shown in FIG. 13, a process of searching a meeting room reservation database and automatically writing a date and a place for the meeting at respective structures based on the information is written in the start operator.

FIG. 14 shows contents displayed after the start operator is executed. As a result of the execution of the start operator, an SGML view 131a of the SGML editor 131 displays the contents of the SGML instance 112c with the date and the place for the meeting being written in step S20.

When the user moves a mouse pointer to the position of "4. Attendants" in the screen of the SGML view 131a and clicks the mouse button in step S30, information about element name "attendants" and an event "click" is sent from the SGML editor 131 to the monitoring processor 120.

Then, the MIPS interpreter 121 of the monitoring processor 120 checks a MIPS script corresponding to the information from the SGML editor 131 from the relationship descriptions in step S51.

FIG. 15 shows an example of a description of the relationship between DTD and an operation description. In a relationship description 114c, an attendant input operator is associated with the event "click" of the element name "attendants". The MIPS interpreter 121 reads and executes the attendant input operator in step S52.

In the example shown in FIG. 13, a process of searching a personnel database, displaying information of the personnel database in a dialog box, selecting persons, and automatically writing names, addresses, and e-mail addresses of the selected persons at respective structures is written in the attendant input operator.

Figure 16:
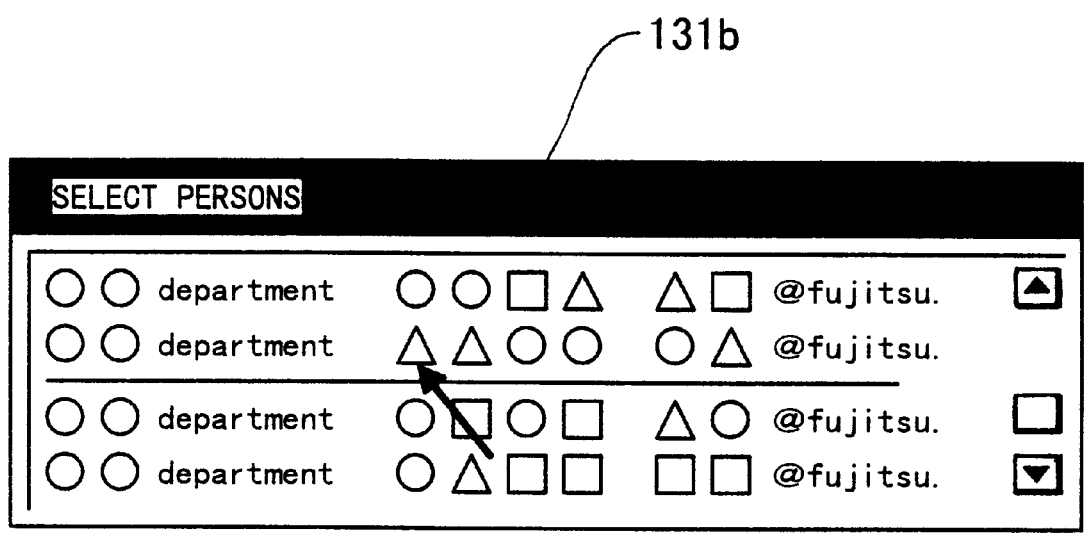
FIG. 16 is a view showing a dialog box for entering attendants.

FIG. 16 shows a dialog box for entering attendants. The user may select desired persons from a dialog box 131b displayed on the screen. After the selection of attendants is finished, the MIPS interpreter 121 adds the information of the attendants at a given position in the SGML instance 112c.

FIG. 17 shows an SGML instance where the information of attendants is added. In an SGML instance 112d, tags "person" are provided below a tag "attendants", and the information of the persons selected by the user is written.

In this manner, the elements of attendants and the personnel database are coupled to each other, and attendants can be entered only by selecting data. Therefore, attendants can be written easily without human errors such as a character entry mistake.

If a process of proofreading the contents of an SGML instance with a document proofreading system which is another system, and sending the SGML instance to the email addresses of persons written as attendants is written as an end operator, then it is possible to assist a process of proofreading and distributing an agenda after the agenda has been generated.

If an operator for writing an electronic signature as an attribute of an element of an SGML instance is prepared and coupled to the element, then it is possible to protect the copyright of each author.

In the above embodiment, only documents are handled. However, if a plurality of types of information including a service process, an organization system, and a document system are provided as management objects, then it is possible to construct a service assisting system which can change assistance more flexibly and dynamically. An example in which an organization chart is dealt with as a management object will be described below.

Figure 18:
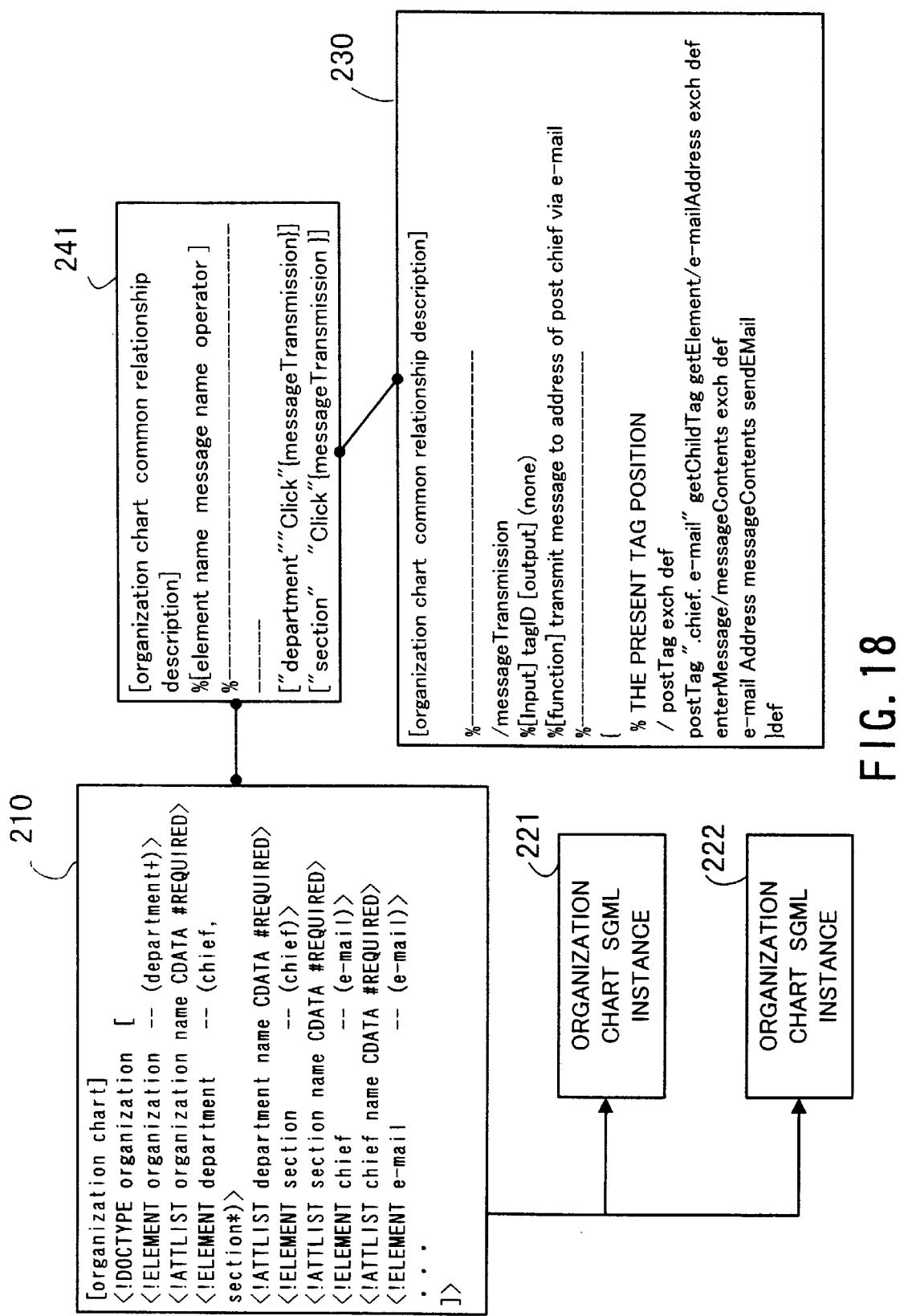
FIG. 18 is a view of an example of a management object dealing with an organization chart.

FIG. 18 shows an example of a management object dealing with an organization chart. In FIG. 18, a MIPS script 230 is provided as an operation description common to organization charts with respect to a DTD 210 of an organization chart. The correspondence between the MIPS script 230 and the DTD 210 is defined by a relationship description 241 common to organization charts. There are also provided a plurality of SGML instances 221, 222 according to the definition of the DTD 210.

The contents of the MIPS script 230 contain a description of the transmission of a message to the manager of the department, for example. This description is written as a message transmission operator in a relationship description 241 so as to be coupled to tags of a department and a section in the DTD 210. When a department or a section in the contents description of an organization described according to the DTD 210 is clicked, the user is prompted to enter a message. When a message is entered, the message is sent by e-mail to the manager of the department or the section. In this manner, a basic service is provided to all departments.

If the above service is changed from the common service to a service peculiar to a department, then the operation description may be related to the SGML instance of the department. This is because if there is an operation description relative to a particular element of the SGML instance, then the operation description is given a preference over an operation description corresponding to the DTD.

Figure 19:
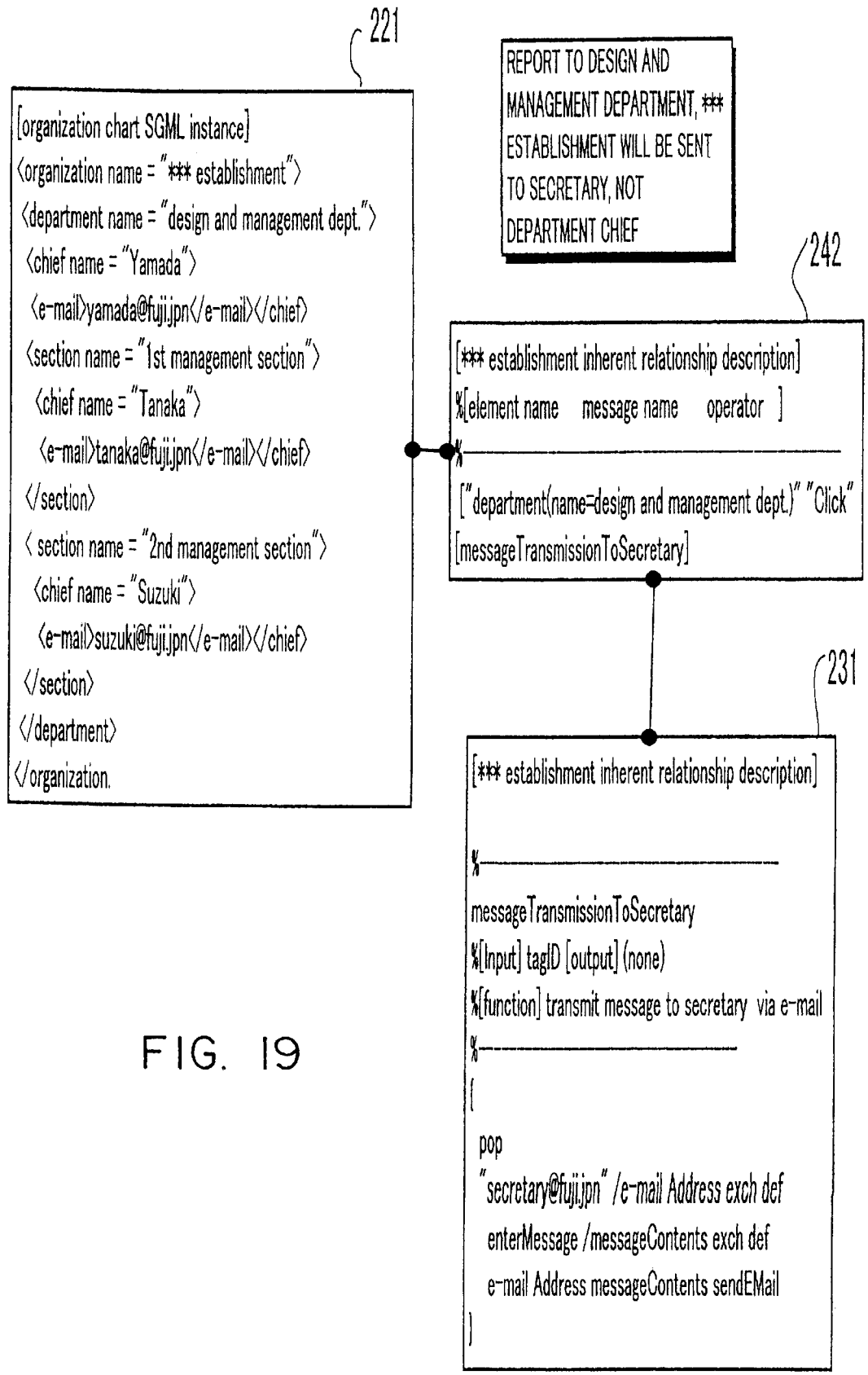
FIG. 19 is a view showing an example of a MIPS script accompanying an SGML instance for "AAA establishment"

FIG. 19 shows an example of a MIPS script accompanying an SGML instance for "AAA establishment". A MIPS script 231 is provided as an operation description corresponding to an SGML instance 221 which represents an organization chart of "AAA establishment". The relationship between the SGML instance 221 and the MIPS script 231 is defined by a relationship description 242.

If an operator is thus described and coupled to a tag of a department in the relationship description accompanying the SGML instance, then a report to a design and management department of AAA establishment is sent to the secretary, but not the manager of the department.

After the common service has been carried out, another process may be added. An example of such another process will be described below.

Figure 20:
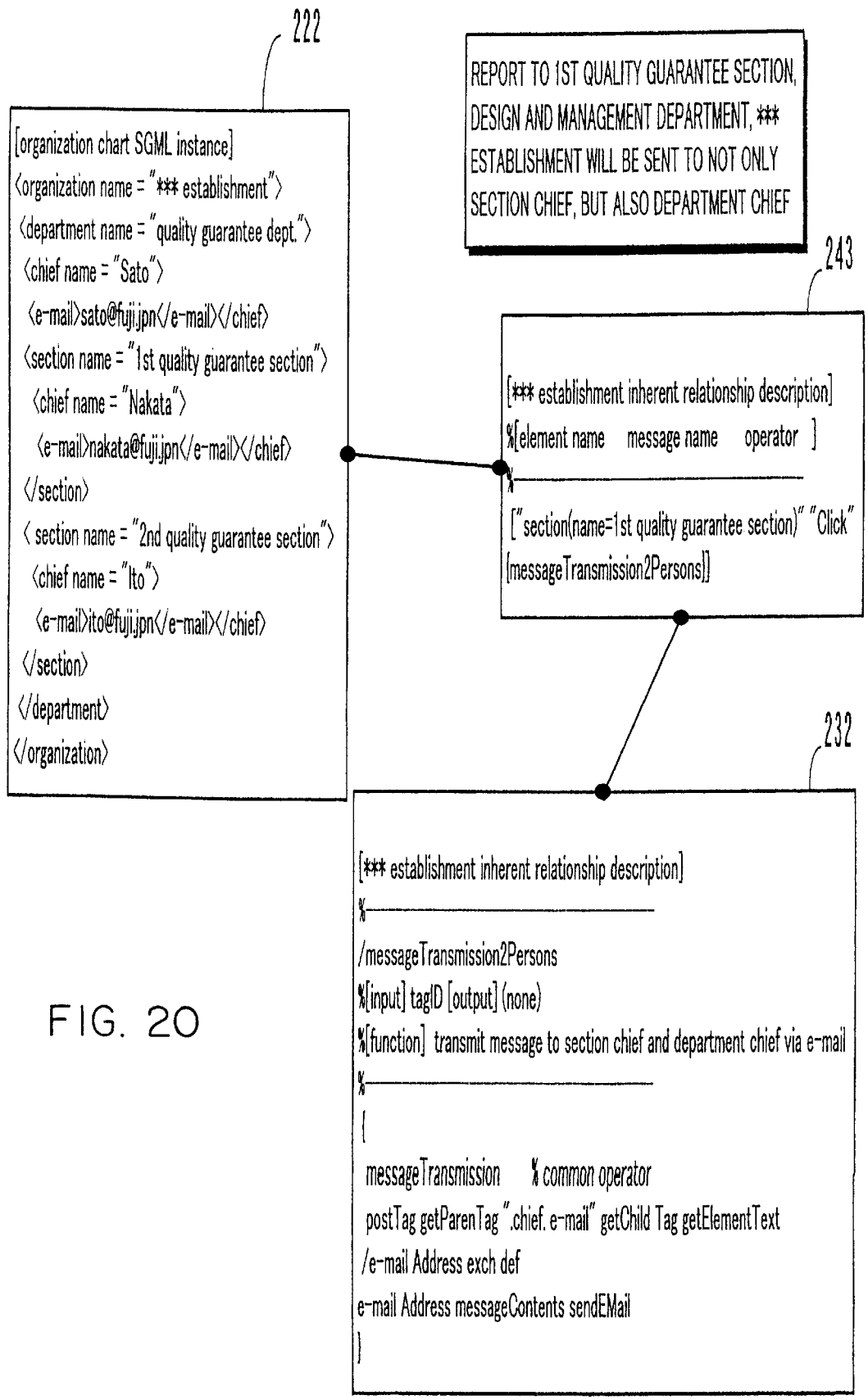
FIG. 20 is a view showing an example of a MIPS script accompanying an SGML instance for "BBB establishment".

FIG. 20 shows an example of a MIPS script accompanying an SGML instance for "BBB establishment". A MIPS script 232 is provided as an operation description corresponding to an SGML instance 222 which represents an organization chart of "BBB establishment". The relationship between the SGML instance 222 and the MIPS script 232 is defined by a relationship description 243. In this manner, a report to a first quality control guarantee section of a quality control guarantee department of "BBB establishment" is sent to not only the chief of the section, but also the manager of the department.

Such a change for sending e-mail to not only the chief of the section, but also the manager of the department who is a supervisor of the chief, can be achieved by calling a common operator from a newly described operator.

In this manner, a service can be changed without affecting other departments which use the same DTD.

The above processing functions can be performed by a computer. Contents of the functions to be provided by the structured data management system are described in a recording medium that can be read by the computer. When the program is executed by the computer, the above processing is performed by the computer. The recording medium that can be read by the computer may be a magnetic recording device, a semiconductor memory, or the like. For making the program available in the market, the program may be stored in a portable recording medium such as a CD-ROM (Compact Disk Read-Only Memory), a floppy disk, or the like, and distributed, or may be stored in a memory of a computer connected to a network and transferred through the network to another computer. For executing the program on the computer, the program is stored in a hard disk drive or the like in the computer, and loaded into a main memory and then executed.

As described above, the structured data management system according to the present invention is capable of defining semantics described in structured electronic data with operation descriptions for unification of semantics of respective elements of the structure to efficient processing of the electronic data. Since contents descriptions and operation descriptions exist individually, the data and the behaviors of the system are separate from each other, allowing description contents to be understood easily and increasing the working efficiency at the time the contents are changed.

With the computer-readable recording medium storing a structured data management program according to the present invention, when the recorded structured data management program is executed by a computer, semantics described in structured electronic data is defined by operation descriptions for enabling the computer to efficiently process electronic data where semantics of respective elements of the structure are unified.

The foregoing is considered as illustrative only of the principles of the present invention. Further, since numerous

What is claimed is:

1. A structured data management system for processing structured electronic data, comprising:

management object holding means for holding a management object comprised of a contents model defining a structure of data to be managed, a contents description describing data to be managed according to the contents model, and an operation description related to the contents model and describing processing contents corresponding to the data in the contents description, the contents model, the contents description, and the operation description being separate from one another; and monitoring means, responsive to a request with respect to said management object holding means, for processing said management object holding means according to the operation description and monitoring the contents description so that the contents description will not depart from the definition of the contents model.

2. A structured data management system according to claim 1, wherein said monitoring means comprises:

operation description executing means for reading the operation description coupled to the contents model which is to be designated and interpreting and executing the operation description based on a processing instruction for said management object holding means; and structure managing means for interpreting the contents model, verifying the structure of the contents description according to the contents model, and manipulating the contents description into a structure adapted to the contents model if said operation description executing means issues an instruction to manipulate the contents description.

3. A structured data management system according to claim 1, wherein the operation description held by said management object holding means is described by a script language.

4. A structured data management system according to claim 1, wherein the operation description held by said management object holding means comprises:

a contents-model-associated operation description related to the contents model and describing processing contents corresponding to all data of the contents description generated according to the contents model; and a contents-description-associated operation description related to a particular contents description generated according to the contents model and describing processing contents corresponding to data of the particular contents description.

5. A structured data management system according to claim 4, wherein said monitoring means comprises means for executing a process according to said contents-description-associated operation description with priority if a process according to said contents-model-associated operation description and the process according to said contents-description-associated operation description exist with respect to particular data.

6. A structured data management system according to claim 1, wherein the operation description held by said management object holding means defines semantics of data of the contents description.

7. A structured data management system according to claim 1, wherein the operation description held by said management object holding means describes a service to be performed depending on data of the contents description.

8. A structured data management system according to claim 1, wherein the operation description held by said management object holding means describes a process corresponding to an element of the contents model for thereby defining a process corresponding to individual data in the contents description.

9. A computer-readable recording medium storing a structural data management program for processing structured electronic data, said structural data management program being capable of controlling a computer to function as:

management object holding means for holding a management object comprised of a contents model defining a structure of data to be managed, a contents description describing data to be managed according to the contents model, and an operation description related to the contents model and describing processing contents corresponding to the data in the contents description, the contents model, the contents description, and the operation description being separate from one another; and monitoring means, responsive to a request with respect to said management object holding means, for processing said management object holding means according to the operation description and monitoring the contents description so that the contents description will not depart from the definition of the contents model.

10. A structured data management system for processing structured electronic data, comprising:

a contents model defining a structure of data to be managed;

a contents description, separate from said contents model, and describing data to be managed according to said contents model;

an operation description, separate from said contents model and said contents description, being associated with said contents model and describing processing contents corresponding to the data in said contents description; and a monitoring unit processing said contents model, said contents description, and said operation description.

11. A method for processing structured electronic data, comprising:

defining a structure of data to be managed in a contents model;

describing data to be managed according to the contents model in a contents description;

describing processing contents corresponding to the data in the contents description in an operation description, the operation description being associated with the contents model, and the contents model, the contents description, and the operation description being separate from one another; and monitoring and processing the said contents model, the contents description, and the operation description.

* * * * *